(12) United States Patent
Jamerson

(10) Patent No.: US 11,750,023 B2
(45) Date of Patent: Sep. 5, 2023

(54) HIGH TEMPERATURE HYBRID BATTERY PACK

(71) Applicant: Eagle Technology, LLC, Melbourne, FL (US)

(72) Inventor: Eric Jamerson, Prospect, VA (US)

(73) Assignee: Eagle Technology, LLC, Melbourne, FL (US)

( * ) Notice: Subject to any disclaimer, the term of this patent is extended or adjusted under 35 U.S.C. 154(b) by 92 days.

(21) Appl. No.: 17/497,534

(22) Filed: Oct. 8, 2021

(65) Prior Publication Data

US 2023/0116503 A1 Apr. 13, 2023

(51) Int. Cl.
*H02J 9/06* (2006.01)
*H02J 7/00* (2006.01)

(52) U.S. Cl.
CPC .............. *H02J 9/06* (2013.01); *H02J 7/0013* (2013.01); *H02J 7/00309* (2020.01)

(58) Field of Classification Search
CPC ......... H02J 9/06; H02J 7/00309; H02J 7/0013
USPC ...................................................... 307/64, 66
See application file for complete search history.

(56) References Cited

U.S. PATENT DOCUMENTS

| | | | |
|---|---|---|---|
| 4,507,368 | A | 3/1985 | Hashimoto |
| 6,140,904 | A | 10/2000 | Jungst et al. |
| 6,747,370 | B2 | 6/2004 | Abe |
| 6,805,993 | B2 | 10/2004 | Kaito et al. |
| 2011/0309681 | A1* | 12/2011 | Kamijima ............. H02J 7/0025 307/66 |
| 2014/0339920 | A1 | 11/2014 | Ingalls, Jr. et al. |
| 2015/0171639 | A1* | 6/2015 | Saeki .................. H01M 10/443 320/107 |
| 2017/0199246 | A1* | 7/2017 | Hindle ................. G01R 31/386 |
| 2020/0209321 | A1 | 7/2020 | Min |
| 2020/0259353 | A1* | 8/2020 | Kirchner ........... H02J 7/007192 |

FOREIGN PATENT DOCUMENTS

| | | |
|---|---|---|
| JP | H8185849 A | 7/1996 |
| JP | H10255757 A | 9/1998 |
| JP | 11-40204 A | 2/1999 |

OTHER PUBLICATIONS

Extended European Search Report for European Patent Application No. 22199973.3 dated Mar. 23, 2023 (8 pages).

* cited by examiner

*Primary Examiner* — Michael R. Fin
(74) *Attorney, Agent, or Firm* — Fox Rothschild LLP; Robert Sacco; Carol E. Thorstad-Forsyth

(57) ABSTRACT

Systems and methods for operating a circuit. The methods comprise: using a first thermal responsive device to connect a first power source between first and second terminals to which an external load can be connected to the circuit; using a second thermal responsive device to cause a thermal unresponsive device to be in an open circuit condition; and performing operations responsive to a temperature of a surrounding environment exceeding a given temperature value. The operations include: disconnecting the first power source from at least the first terminal by transitioning the first thermal responsive device from a closed state to an open state; and connecting a second power source between the first and second terminals by transitioning the thermal unresponsive device from the open circuit condition to a closed circuit condition using the second thermal responsive device.

20 Claims, 9 Drawing Sheets

HIGH TEMPERATURE HYBRID BATTERY PACK

BACKGROUND

Statement of the Technical Field

The present document concerns batteries and battery packs. More particularly, the present document relates to improved operational features that allow a battery to continue to operate safely at elevated temperatures.

Description of the Related Art

Small, light-weight rechargeable batteries having high energy density are widely used as power sources for portable electronic devices. Such rechargeable batteries include lithium ion-based batteries and lithium ion polymer batteries. Such rechargeable batteries perform well at elevated temperatures, but prolonged exposure to heat reduces their life spans. Characteristics of these rechargeable batteries may also deteriorate when the batteries are used under conditions exceeding certain ranges of voltages. Also, if a battery is subjected to over-charging or is left at high temperature, leakage of electrolyte may occur due to a rise in internal pressure. Accordingly, various protective devices for batteries have been proposed.

For example, Japanese Laid-open Patent Application No. 8-185849 proposes a protective device having a shape-memory alloy to shut off the electricity supply from outside of the battery upon an abnormal rise in temperature. Japanese Laid-open Patent Application No. 11-40204 teaches separation of the battery from a charging circuit upon detecting a rise in the internal pressure or temperature of the battery. This document also proposes protection of battery from over-charging by use of a varistor element that operates at a voltage exceeding a predetermined value. Japanese Laid-open Patent Application No. 10-255757 proposes a protective device having a shape-memory alloy to cause short-circuiting across the positive and negative electrodes upon detection of an abnormal rise in the temperature of the battery.

Recently, fire departments and other similar government agencies have released safety codes requiring continuous operation of radios and other battery powered devices in high temperature environments. The National Fire Protection Association (NFPA) has recently released NFPA 1802, Standard on two-way, portable Radio Frequency (RF) voice communication devices for use by emergency services personnel in hazard zones. This Standard requires that portable RF voice communication devices to continue to operate at temperatures up to two hundred sixty degrees Celsius for at least five minutes. However, current battery protection and safety features of RF voice communication devices cause the batteries thereof to transition to a protected mode when operating temperatures of their batteries exceed an operating temperature limit of sixty-five degrees Celsius. In protected mode, the RF voice communication devices no longer operate until the operating temperatures of the batteries return to an acceptable range (e.g., less than sixty degrees Celsius). Thus, requirements of the NFPA 1802 Standard are not met by conventional RF voice communication devices.

SUMMARY

This document concerns implementing systems and methods for operating a circuit. The circuit is configured to facilitate a load's operation in harsh conditions (e.g., allow a radio to operate at temperatures exceeding sixty-five degrees Celsius for a period (e.g., 5-10 minutes)). The methods comprise: using a first thermal responsive device to connect a first power source (e.g., lithium ion battery cells) between first and second terminals to which an external load can be connected to the circuit; using a second thermal responsive device to cause a thermal unresponsive device to be in an open circuit condition; and performing certain operations responsive to a temperature of a surrounding environment exceeding a given temperature value (e.g., sixty-five degrees Celsius). These operations involve: disconnecting the first power source from at least the second terminal by transitioning the first thermal responsive device from a closed state to an open state; and connecting a second power source (e.g., a supercapacitor or an alternate chemistry battery) between the first and second terminals by transitioning the thermal unresponsive device from the open circuit condition to a closed circuit condition using the second thermal responsive device.

The first and/or second thermal responsive device can include, but are not limited to, thermistors and/or thermal fuses. The thermal unresponsive device can include, but is not limited to, a field effect transistor. The thermal unresponsive device may be in the open circuit condition when the second thermal responsive device is in a closed state, and may be in the closed circuit condition when the second thermal responsive device is in an open state.

In some scenarios, the methods also comprise performing the following operations responsive to the temperature of the surrounding environment being less than the given temperature value: reconnecting the first power source to the second terminal by transitioning the first thermal responsive device from the open state to the closed state; and disconnecting the second power source from at least one of the first and second terminals by transitioning the thermal unresponsive device from the closed circuit condition to the open circuit condition using the second thermal responsive device.

The present document also relates to a circuit. The circuit is configured to facilitate a load's operation in harsh conditions (e.g., allow a radio to operate at temperatures exceeding sixty-five degrees Celsius for a period (e.g., 5-10 minutes)). The circuit comprises: first and second power sources connected in parallel with each other; a first thermal responsive device (e.g., a thermistor or a thermal fuse) connected in series with the first power source (e.g., lithium ion battery cells) and configured to selectively connect and disconnect the first power source from at least a first terminal of two terminals between which an external load (e.g., a communication device) can be connected to the circuit based on a temperature of a surrounding environment; a thermal unresponsive device (e.g., a field effect transistor) connected to the second power source (e.g., a supercapacitor or an alternate chemistry battery); and a second thermal responsive device (e.g., a thermistor or a thermal fuse) connected connected to the thermal unresponsive device and configured to selectively cause the thermal unresponsive device to transition between an open circuit condition and a closed circuit condition based on the temperature of the surrounding environment.

The first power source is connected to the first and second terminals and the second power source is disconnected from at least one of the first and second terminals when the temperature of the surrounding environment exceeds the given temperature value (e.g., sixty-five degrees Celsius). The first power source is disconnected from at least one of the first and second terminals and the second power source is connected to the first and second terminals when the temperature of the surrounding environment is less than the given temperature value.

The thermal unresponsive device may be in the open circuit condition when the second thermal responsive device is in a closed state, and may be in the closed circuit condition when the second thermal responsive device is in an open state. The first power source is disconnected from the first terminal when the temperature of the surrounding environment exceeds the given threshold value, and the second power source is disconnected from the second terminal when the temperature of the surrounding environment is less than the given temperature value. The second power source is disconnected from the second terminal by transitioning the thermal unresponsive device from the closed circuit condition to the open circuit condition using the second thermal responsive device.

BRIEF DESCRIPTION OF THE DRAWINGS

This disclosure is facilitated by reference to the following drawing figures, in which like numerals represent like items throughout the figures.

DETAILED DESCRIPTION

Figure 1:
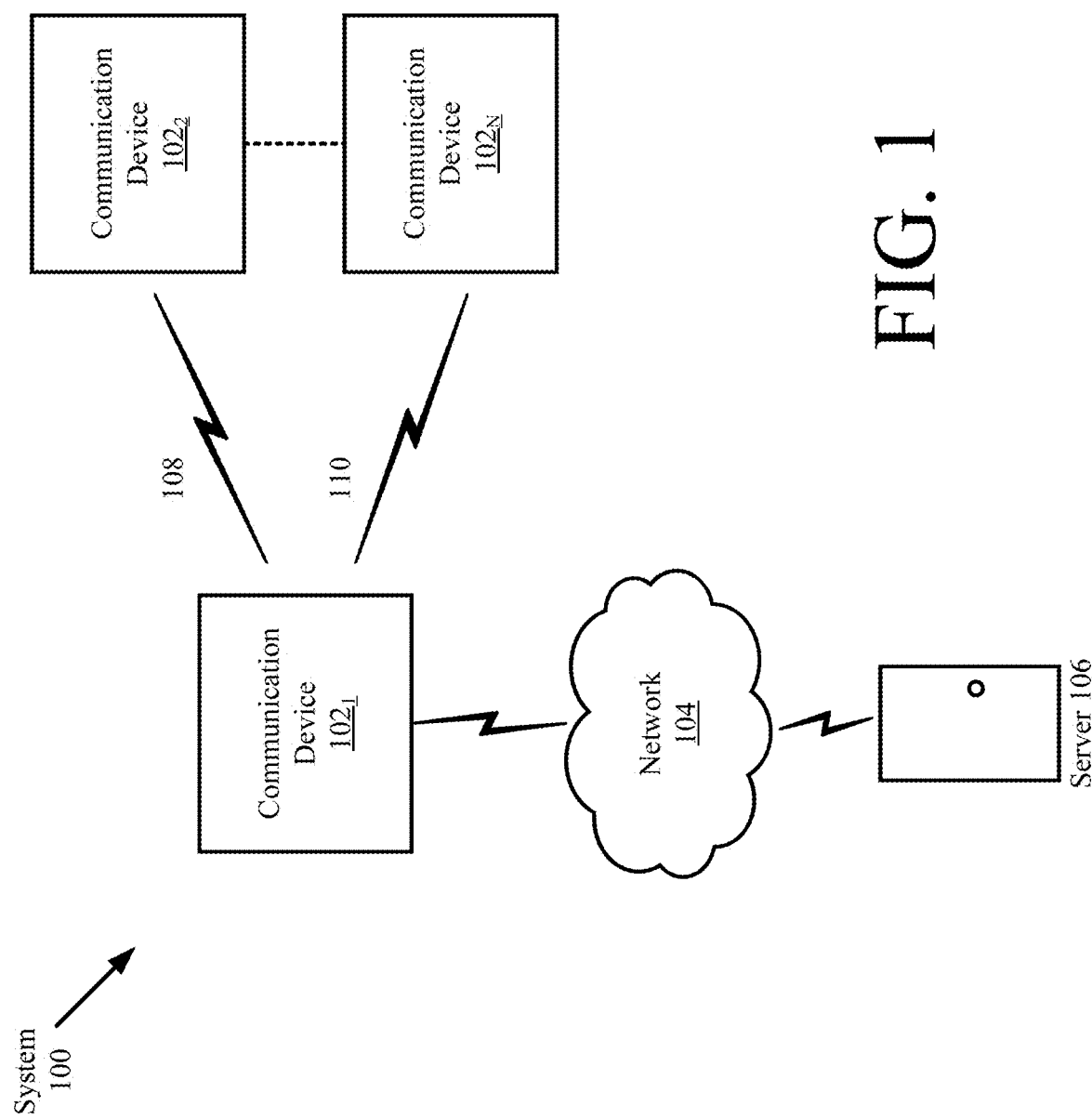
FIG. 1 provides an illustration of a system.

It will be readily understood that the solution described herein and illustrated in the appended figures could involve a wide variety of different configurations. Thus, the following more detailed description, as represented in the figures, is not intended to limit the scope of the present disclosure but is merely representative of certain implementations in different scenarios. While the various aspects are presented in the drawings, the drawings are not necessarily drawn to scale unless specifically indicated.

Reference throughout this specification to features, advantages, or similar language does not imply that all the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

As noted above, rechargeable batteries are widely used to power portable electronic devices. In all applications, it is desirable that fluids (e.g., liquid electrolyte) do not leak from the batteries in any circumstances and/or the batteries maintain relatively high performance even under harsh conditions. Battery overcharge and battery overheating are common reasons for battery leakage. Battery performance may deteriorate when its operating voltage and/or operating temperature is(are) outside of given range(s).

The present solution provides a means to (i) ensure battery leakage does not occur during overcharge and overheating conditions and (ii) improves the operational performance of the batteries when subjected to harsh conditions (e.g., temperatures exceeding sixty-five degrees Celsius). To achieve features (i) and (ii), a power source is provided for electronic devices that includes Thermal Responsive Devices (TRDs) (e.g., thermal fuses or switches) and a Thermal Unresponsive Device (TUD) (e.g., a Field Effect Transistor or other switch) that are collectively configured to selectively disconnect a primary battery source from a load and connect a secondary power source to the load when an operating temperature exceeds a given value.

Referring now to FIG. 1, there is shown an illustrative system 100 in which the present solution can be employed. System 100 comprises communication devices $102_1$, $102_2$, . . . , $102_N$, a network 104, and a server 106. Communications devices $102_1$, $102_2$, . . . , $102_N$ can include, but is not limited to, portable radios (e.g., land mobile radios), vehicular radios, mobile phones, cellular phones, and/or other wireless communication devices. The communication devices $102_1$, $102_2$, . . . , $102_N$ are configured to communicate with each other via wireless communication links 108, 110. The communication device(s) can also communicate with a remote server 106 via network 104 (e.g., the Internet). The communications can include voice communications and data communications.

Figure 2:
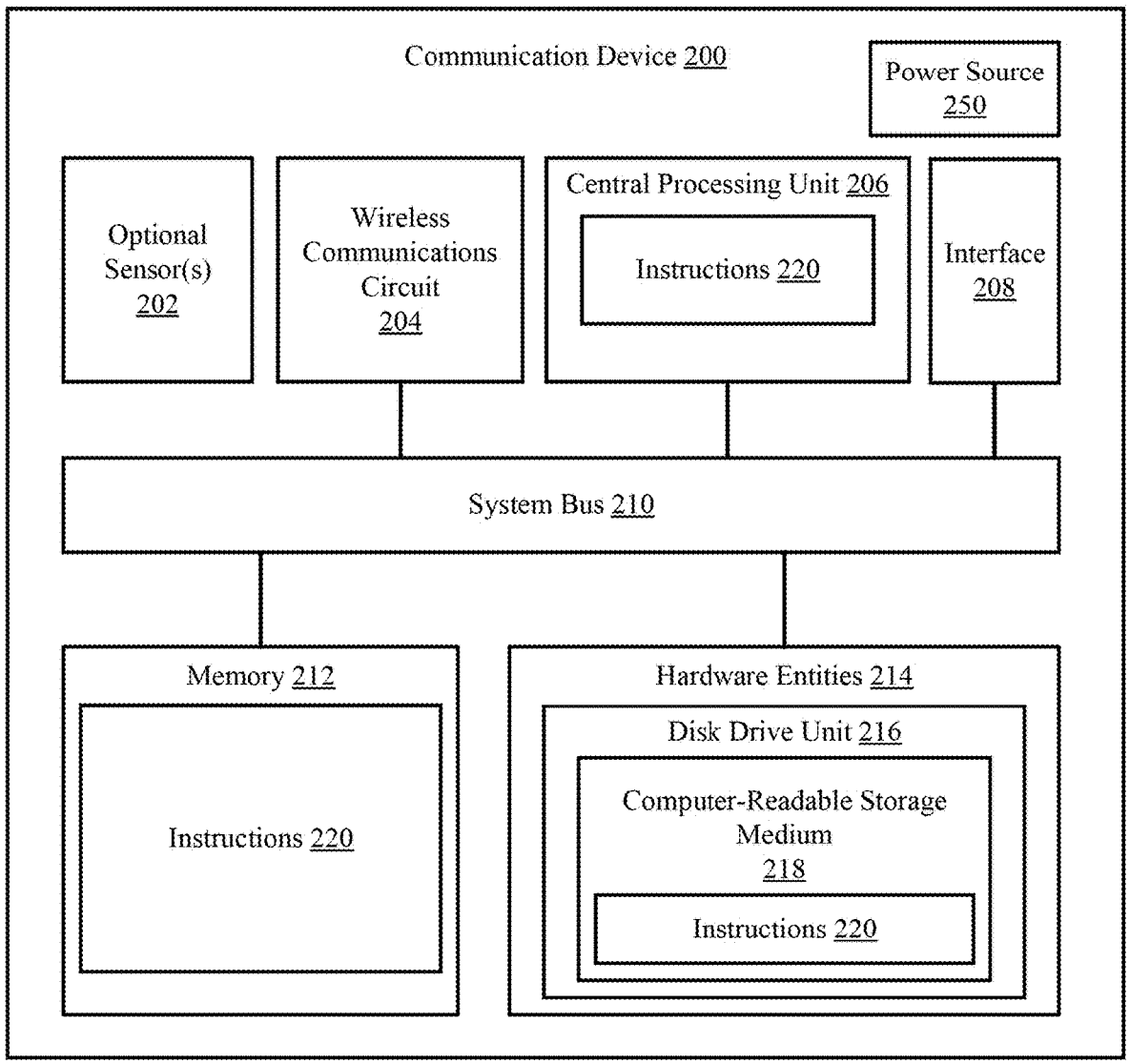
FIG. 2 provides a block diagram of an illustrative architecture for a communication device.

A more detailed diagram of a communication device 200 is provided in FIG. 2. Communication devices $102_1$, $102_2$, . . . , $102_N$ can be the same as or substantially similar to communication device 200. As such, the discussion of communication device 200 is sufficient for understanding communication devices $102_1$, $102_2$, . . . , $102_N$ of FIG. 1.

Communication device 200 may include more or less components than those shown in FIG. 2. However, the components shown are sufficient to disclose an illustrative solution implementing the present invention. The hardware architecture of FIG. 2 represents one implementation of a representative communication device configured to enable wireless communications to/from remote devices as described herein. As such, the communication device 200 of FIG. 2 implements at least a portion of the method(s) described herein.

Some or all the components of the communication device 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

The communication device 200 is designed to act as at least one of a wireless data hub, a wired data hub, a sensor hub, an Intelligence Surveillance Reconnaissance (ISR) receiver, a power conditioner, an audio adaptor, a Human Machine Interface (HMI) adaptor, and/or environmental/event sensor. Accordingly, as shown in FIG. 2, the communication device 200 comprises optional sensor(2) 202, a wireless communications circuit 204, a Central Processing Unit (CPU) 206, an interface 208, a system bus 210, a memory 212 connected to and accessible by other portions of communication device 200 through system bus 210, and hardware entities 214 connected to system bus 210. Each of the listed components is supplied power form a power source 250. Power source 250 can include a battery, a battery pack, a supercapacitor and/or an energy harvester (e.g., for harvesting energy from light, RF signals, etc.).

The sensor(s) 202 can include, but are not limited to, biometric sensors, a Global Positioning System (GPS) sensor, a microphone, and/or a motion sensor. The wireless communications circuit 204 is configured to facilitate wireless communications with external devices. In this regard, circuit 204 comprises a transceiver. Transceivers are well known in the art, and therefore will not be described herein. Any known or to be known transceiver can be used herein without limitation. In some scenarios, the transceiver is an RF transceiver. The interface 208 provides a means for electrically connecting the communication device 200 to Input/Output (I/O) circuits and antennas. The I/O circuits can include, but are not limited to, an audio circuit, a data/control circuit, and/or a power supply charging circuit (e.g., an electrical connector for connecting to an external power source for charging a battery of power source 250).

At least some of the hardware entities 214 perform actions involving access to and use of memory 212, which can be a Random Access Memory (RAM), and/or a disk driver. Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the communication device 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the communication device 200 and that cause the communication device 200 to perform any one or more of the methodologies of the present disclosure.

Communications device 200 can include, but is not limited to, a portable radio (e.g., a land mobile radio). Front and back perspective views of an illustrative architecture for a portable radio are provided in FIGS. 3-4. The present solution is not limited to the shown architecture since the communication device 200 can alternatively comprise a vehicular radio, a mobile phone, a cellular phone, or other wireless communication device. The portable radio architecture of FIGS. 3-4 is provided to facilitate explanation the present solution.

Figure 3:
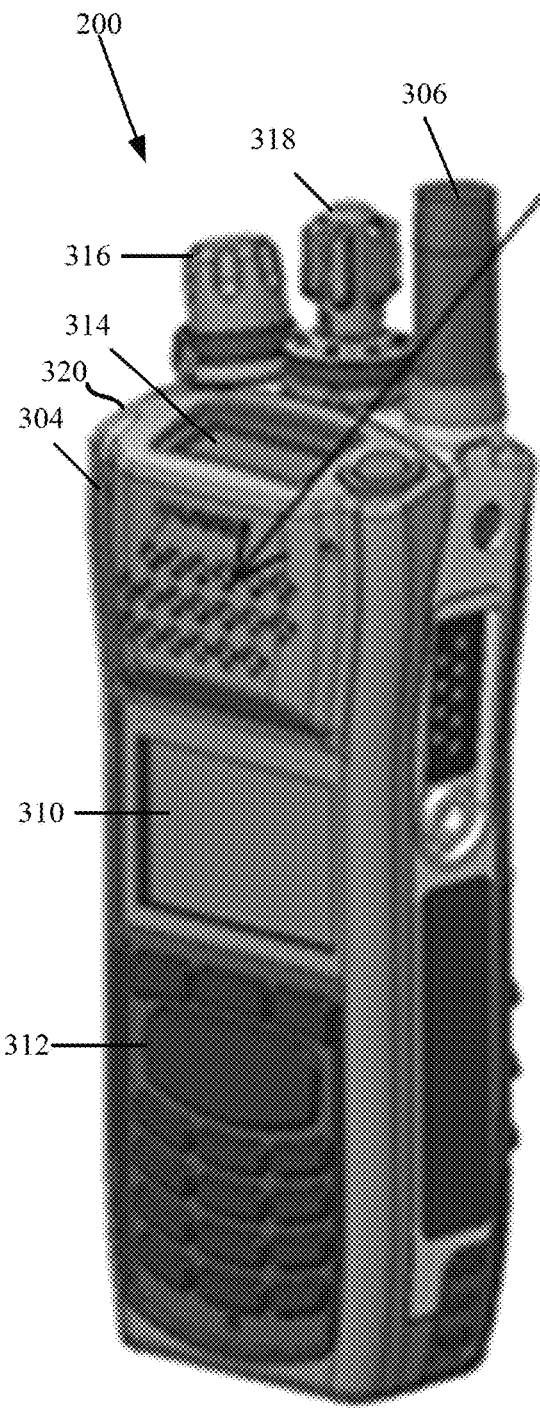
FIG. 3 provides a front perspective view of a communication device.
Figure 4:
FIG. 4 provides a rear perspective view of the communication device shown in FIG. 2.

As shown in FIGS. 3-4, the portable radio comprises a main body 320 in which various components are disposed. These components include, but are not limited to, transducer(s) 302, 402, antenna(s) 306, a microphone 304, display(s) 310, 314, a control panel (or keypad) 312, and rotary knob(s) 316, 318. Each of the listed components is well known in the art, and therefore will not be described in detail herein. The transducer volume is manually adjustable via rotary knob 316, control panel 312 and/or display 310. In the control panel scenarios, a user can select a volume level from a menu of volume levels contained in a Graphical User Interface (GUI) displayed on display 310. In other scenarios, display 310 is a touch-screen display by which a user can select the volume level from the menu.

The power source 250 is removably attached to the main body 320 of the portable radio. This attachment can be achieved using clips, latches and/or other mechanical couplers. The power source 250 is provided to power components 302, 304, 310-318, 402 of the portable radio. The power source 250 can include a battery pack comprising rechargeable batteries and a power management circuit. The power management circuit is configured to facilitate operation of the power source such that (i) battery leakage does not occur during overcharge and overheating conditions and (ii) the power source has improved operational performance when subjected to harsh conditions (e.g., temperatures exceeding sixty-five degrees Celsius) (as compared to conventional communication devices such as those discussed in the background section of this document). The particulars of power management circuit will be discussed in more detail below.

Figure 6:
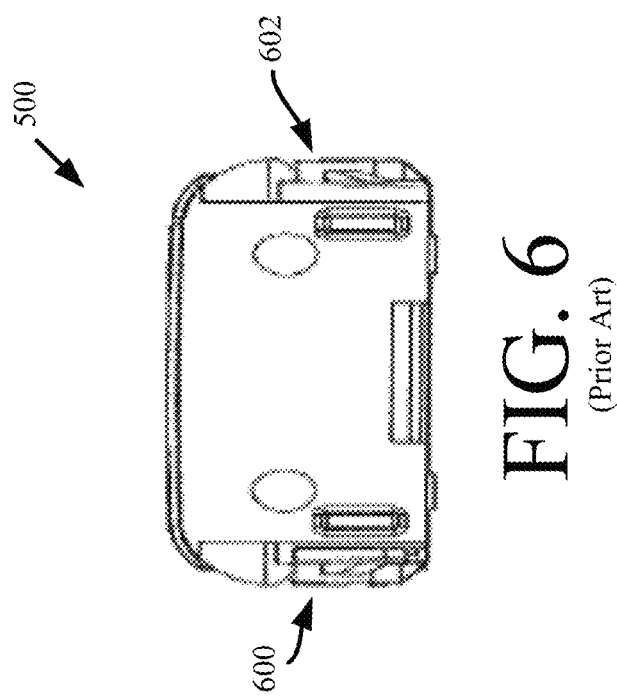
FIG. 6 provides a top view of the conventional battery pack shown in FIG. 5.
Figure 5:
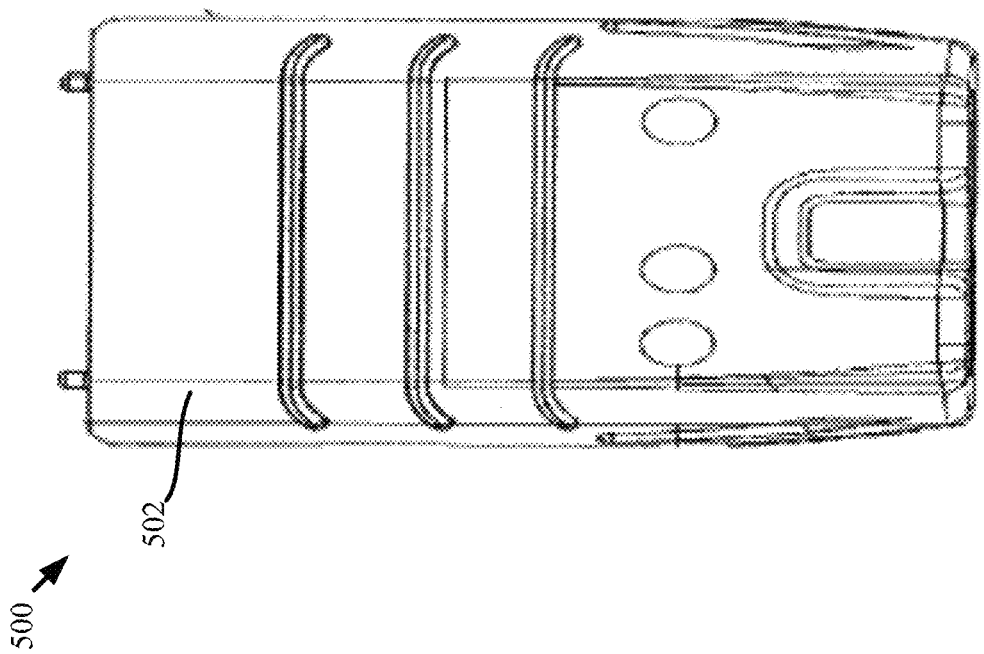
FIG. 5 provides a front view of a conventional battery pack for a communication device.
Figure 7:
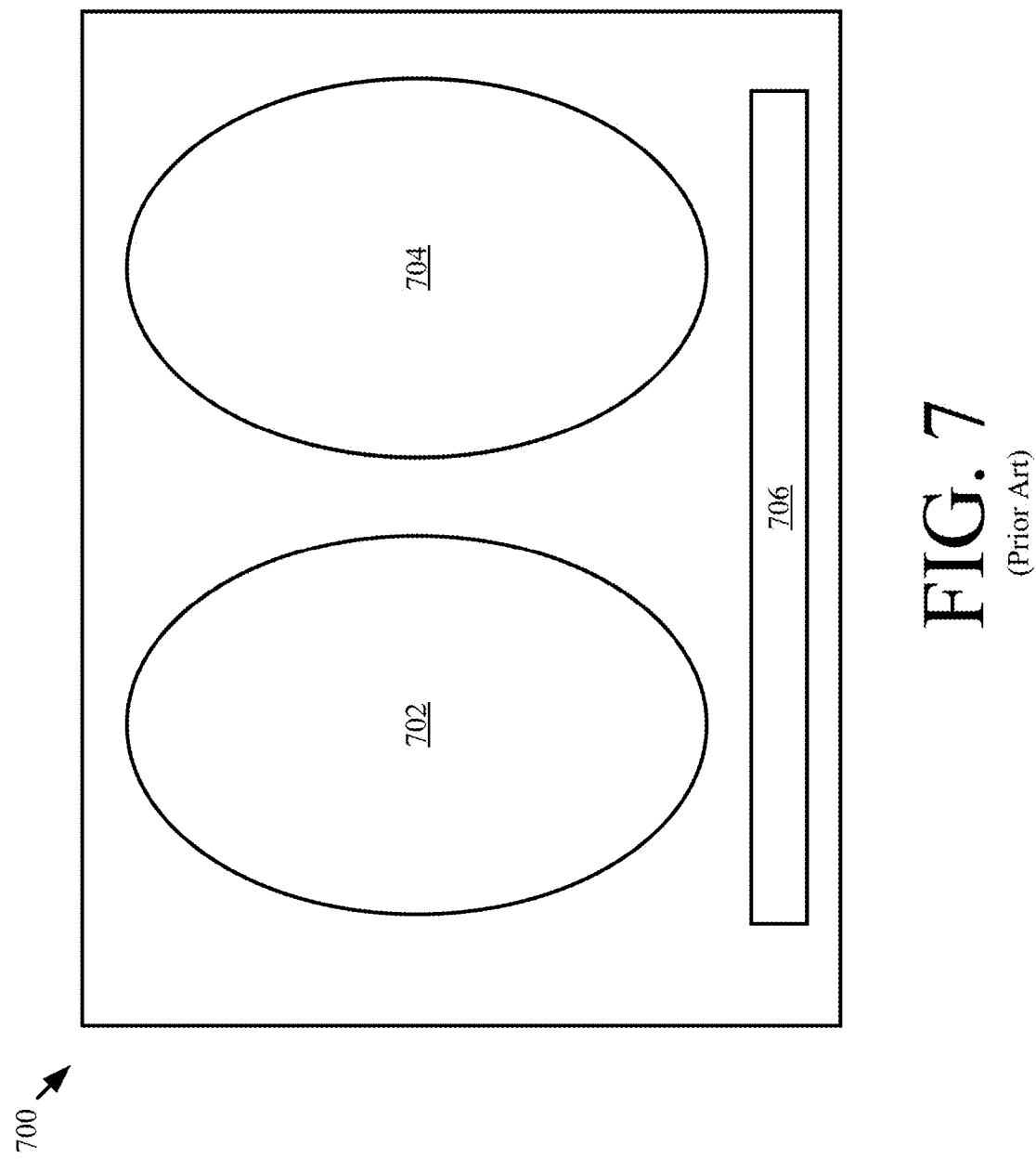
FIG. 7 provides an illustration of a circuit board layout for the conventional battery pack shown in FIGS. 5-6.

Referring now to FIGS. 5-7, an architecture is shown for a conventional power source 500 that can be used with portable radios. Power source 500 comprises a housing 502 provided with coupler(s) 600, 602 for mechanically and removably attaching the power source 500 to a portable radio's main body. A circuit board 706 is disposed in the housing 502. A pair of battery cells 702, 704 and a battery management circuit 706 are provided. The battery management circuit 706 is electrically connected to the battery cells 702, 704. The battery management circuit 706 is configured to control the charging of the battery cells 702, 704 by an external battery charger, control the discharging of the battery cells for supplying power to radio circuitry, and electrically disconnect the battery cells 702, 704 from the radio circuitry when an operating temperature exceeds a predefined threshold temperature. The electrical disconnection of the battery cells from the radio circuitry is performed to protect the battery cells from damage due to harsh conditions. The battery cell disconnection results in a termination of power being supplied to the radio circuitry and renders the radio inoperative (which could have significant consequences in emergency situations).

Figure 9:
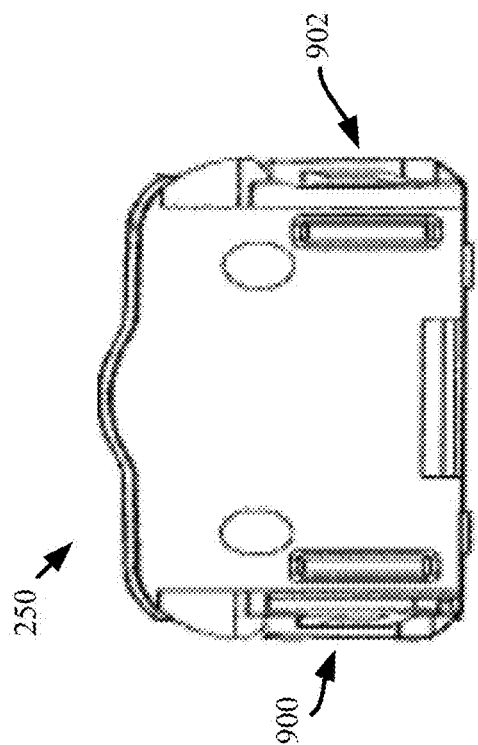
FIG. 9 provides a top plan view of the battery pack shown in FIG. 8.
Figure 8:
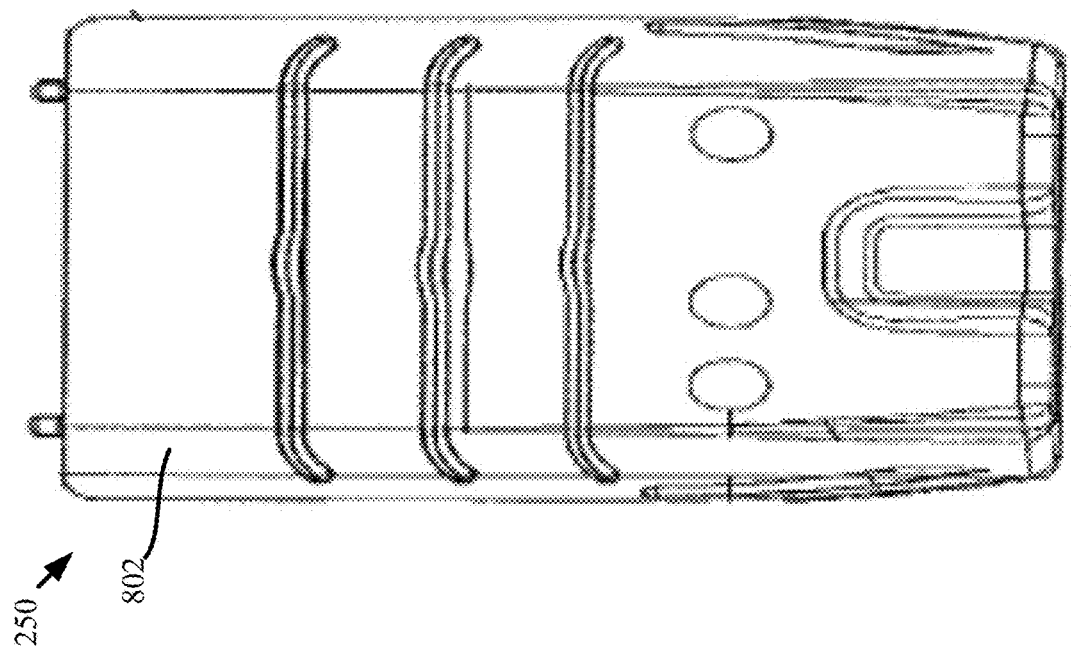
FIG. 8 provides a front view of a battery pack in accordance with the present solution.

Referring now to FIGS. 8-9, an architecture is shown for a novel power source 250 that can be used with portable radio 200 discussed above in relation to FIGS. 2-4. Power source 250 comprises a housing 802 provided with coupler(s) 900, 902 for mechanically and removably attaching the power source 250 to a portable radio's main body 320. A circuit board 1006 is disposed in the housing 802. A primary power source 1010, a secondary power source 1012 and a battery management circuit 1006 are provided. The primary power source 1010 comprises a pair of battery cells 1002, 1004 that are to be used during normal operating conditions of the portable radio 200. The battery cells 1002, 1004 can include, but are not limited to, lithium ion cells. The normal operating conditions exist when an operating temperature of the power source 250 is less than a predefined operating temperature limit or threshold (e.g., 65° C.). The secondary power source 1012 is used during abnormal operating conditions of the portable radio 200. The secondary power source 1012 can include, but is not limited to, alternate chemistry battery(ies) 1008 and/or supercapacitor(s) 1014. The alternate chemistry batteries can be absent of lithium ion-based batteries and/or lithium ion polymer batteries. The alternate chemistry batteries can include, but are not limited to, sodium, magnesium, zinc and/or aluminum. The abnormal operating conditions exit when the operating temperature of the power source 250 is equal to or greater than the predefined operating temperature limit or threshold (e.g., 65° C.). This selective use of the power sources 1010, 1012 allows the radio 200 to operate (e.g., transmit and receive communications) during times when a traditional radio would be turned off due to harsh conditions.

The battery management circuit 1006 is electrically connected to the primary power source 1010 and the secondary power source 1012. The battery management circuit 1006 is configured to control the charging of components 1002, 1004, 1008, 1014 by an external battery charger, control the discharging of the components 1002, 1004, 1008, 1014 for supplying power to radio circuitry (e.g., components 202-214 of FIG. 2, components 302, 304, 310-318 of FIG. 3, and/or component 402 of FIG. 4), and electrically disconnect the components 1002, 1004, 1008, 1014 from the radio circuitry when certain conditions are detected. For example, the battery management circuit 1006 causes the primary power source 1010 to be electrically connected to the radio circuitry and the secondary power source 1012 to be electrically disconnected from the radio circuitry when the operating temperature Tis less than the predefined operating temperature threshold value (e.g., T<65° C.). The battery management circuit 1006 causes the secondary power source 1012 to be electrically connected to the radio circuitry and the primary power source 1010 to be electrically disconnected from the radio circuitry when the operating temperature Tis greater than the predefined operating temperature threshold value (e.g., T>65° C.). Upon cooling, the battery management circuit 1006 reconnects the primary power source 1010 to the radio circuitry. In this way, the battery management circuit 1006 selectively switches the supply of power to the radio circuitry between the primary power source 1010 and the secondary power source 1012 based on whether the radio 200 is subjected to normal or elevated temperatures.

Figure 11:
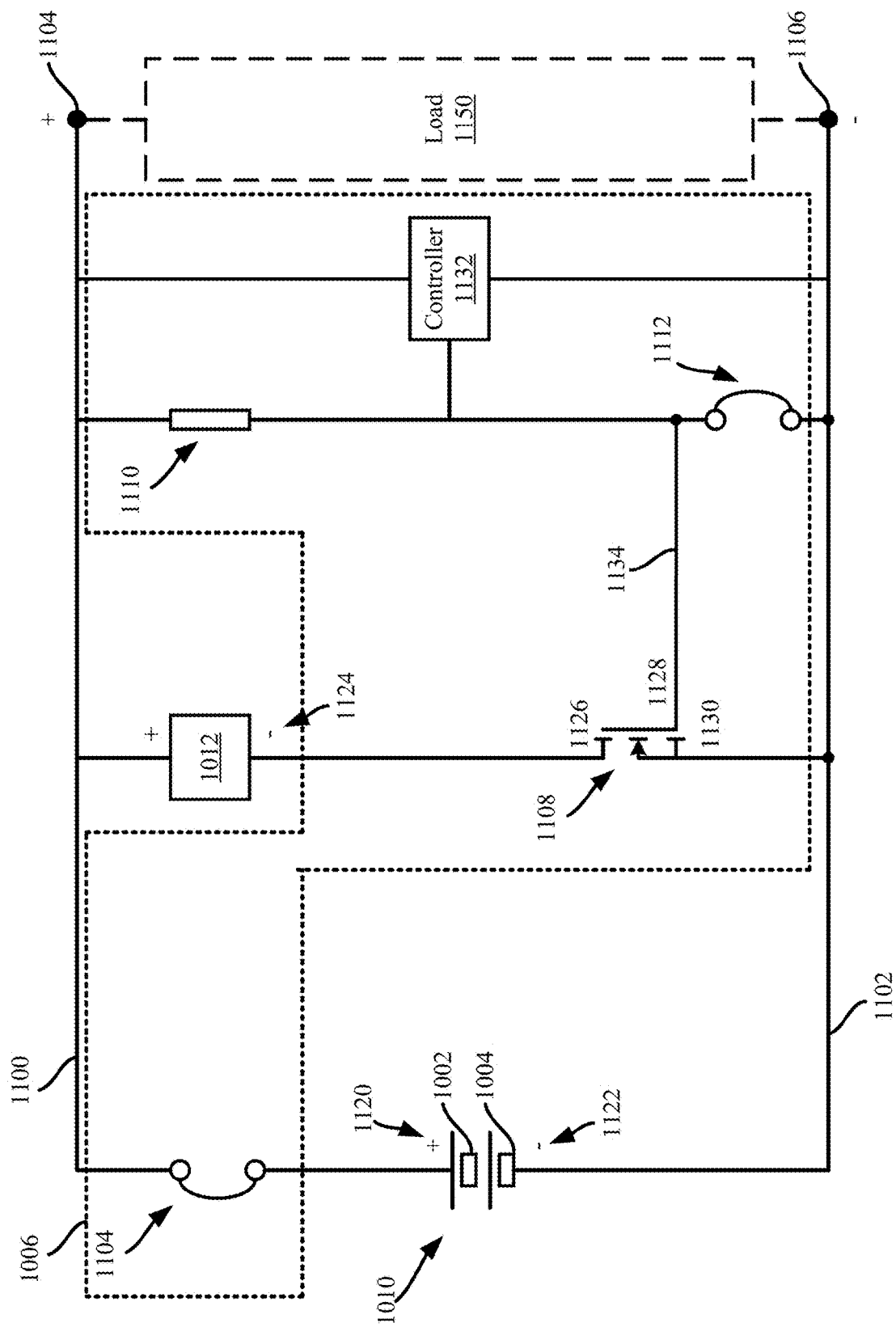
FIG. 11 provides a more detailed diagram for the battery management circuit shown in FIG. 10.

A more detailed circuit diagram for power source 250 is provided in FIG. 11. As shown in FIG. 11, the primary power source 1010 and the secondary power source 1012 are connected in parallel between input/output lines 1100, 1102. A load may be connected to lines 1100, 1102 via terminals 1104, 1106. The load can include, but is not limited to, radio circuitry (e.g., components 202-214 of FIG. 2, components 302, 304, 310-318 of FIG. 3, and/or component 402 of FIG. 4). Battery cells 1002, 1004 of the primary power source 1010 are connected in series between lines 1100, 1102.

The battery management circuit 1006 comprises TRDs 1104, 1112, a TUD 1108, a resistor 1110 and a controller 1132. The TRDs 1104, 1112 can include thermal fuses (as shown in FIG. 11) and/or thermal switches (not shown) (e.g., thermistors). TRDs 1104, 1112 can be the same as or different than each other. TRD 1104 is connected between a positive terminal 1120 of the primary power source 1010 and output line 1100. Resistor 1110 and TRD 1112 are connected in series between lines 1100, 1102, and in parallel with the load when connected to the power source 250. The TRDs 1104, 1112 are configured to detect an operating temperature of the radio 200 and transition from a closed state to an open state when the operating temperature is excessive (i.e., exceeds a predetermined temperature threshold value). The TRDs can reset or otherwise return to the closed state when the operating temperature returns to a normal level (i.e., falls below the predetermined temperature threshold value). The primary power source 1010 is connected to the load when TRDs 1104, 1112 are in their closed states. The primary power source 1010 is disconnected from the load when TRDs 1104, 1112 are in their open state. The secondary power source 1012 is disconnected to the load when TRDs 1104, 1112 is in their closed state, and connected to the load when the TRDs 1104, 1112 is in their open state. In effect, power is supplied to the load from the primary power source 1010 in normal operating conditions and power is supplied to the load from the secondary power source 1012 in abnormal operating conditions.

TUD 1108 is connected between a negative terminal 1124 of the secondary power source 1012 and output line 1102. TUD 1108 can include, but is not limited to, an N-channel type Metal Oxide Semi-Conductor (NMOS) Field Effect Transistor (FET) as shown in FIG. 11. FET has three terminals respectively defined as a source 1126, gate 1128 and drain 1130. An electrical path can be provided from the source to the drain of FET. This path is generally referred to herein as the source-drain path. The source-drain path is connected in series with the secondary power source 1012. The gate 1128 of FET is connected to resistor 1110 and TRD 1112 via connection line 1134. FET is switched Off (or in an open circuit condition) when its gate 1128 is connected to ground when TRD 1112 is in its closed state. FET is switched ON (or in a closed circuit condition) when TRD 1112 is in its open state, whereby current flows through the source-drain path.

The controller 1132 is also connected across lines 1100, 1102 and is configured to control the charging of the power sources 1010, 1012. Controller 1132 can include, but is not limited to, a processor and/or memory with instructions to cause the processor to perform certain operations. In some scenarios, the controller is further configured to control TUD 1108 for controllably connecting and disconnecting the secondary power source 1012 to/from the load.

During operation, TRDs 1104, 1112 are in their closed states and TUD 1108 is in its open circuit condition when the operating temperature is less than a predefined temperature threshold value. At this time, the primary power source 1010 is connected to the load, while the secondary power source 1012 is disconnected from the load.

When the operating temperature reaches or exceeds the predefined temperature threshold, the TRDs 1104, 1112 transition to their open states and TUD 1108 transitions to its closed circuit condition. At this time, the secondary power source 1012 is connected to the load, while the primary power source 1010 is connected from the load.

In some scenarios, the TRDs 1104, 1112 are reversible such that the TRDs 1104, 1112 transition to their closed states when the operating temperature returns to a value below the predefined temperature threshold. The TUD 1108 will transition to its open circuit condition when this condition exits. Consequently, the primary power source 1010 is reconnected to the load, while the secondary power source 1012 is once again disconnected from the load.

Figure 10:
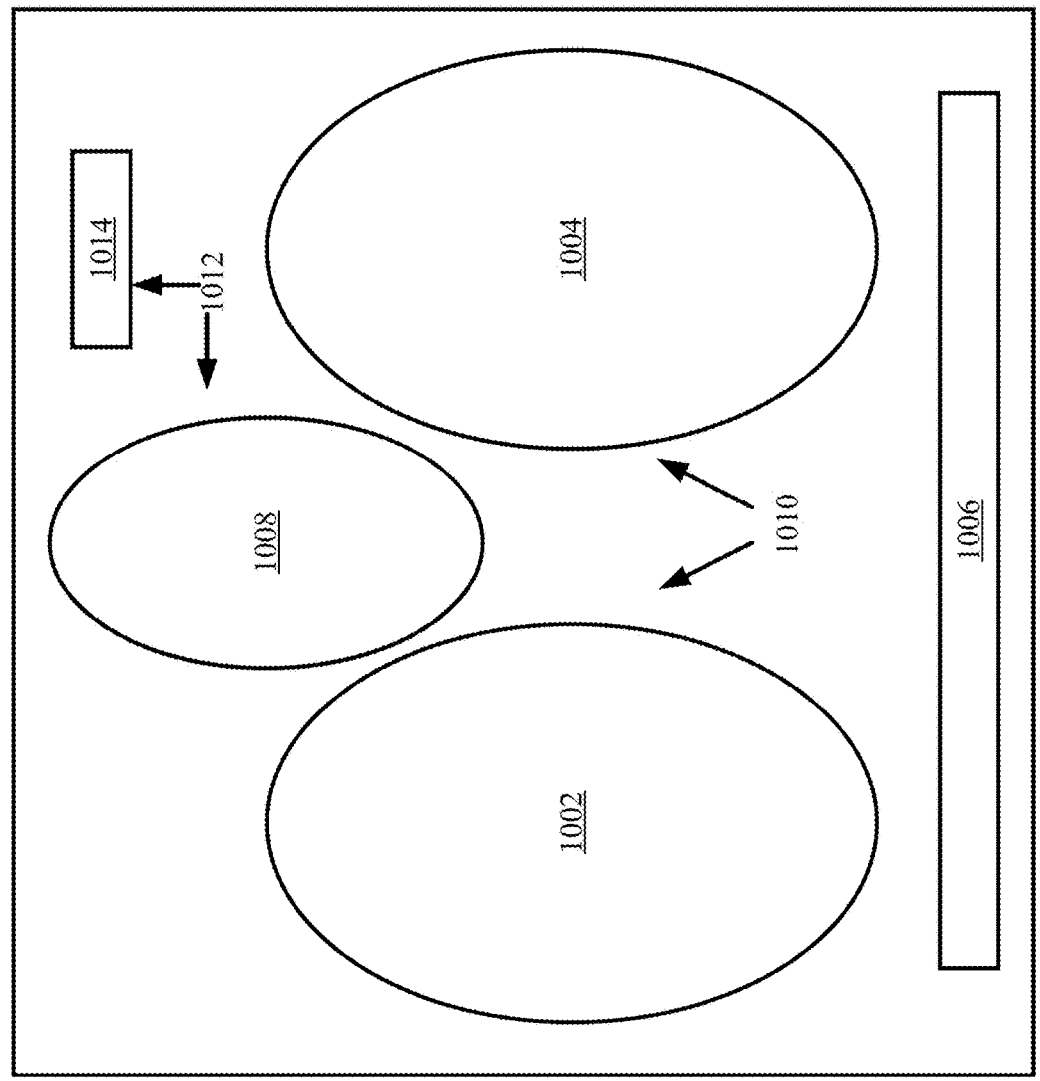
FIG. 10 provides an illustration of a circuit board layout for the battery pack shown in FIGS. 8-9.
Figure 12:
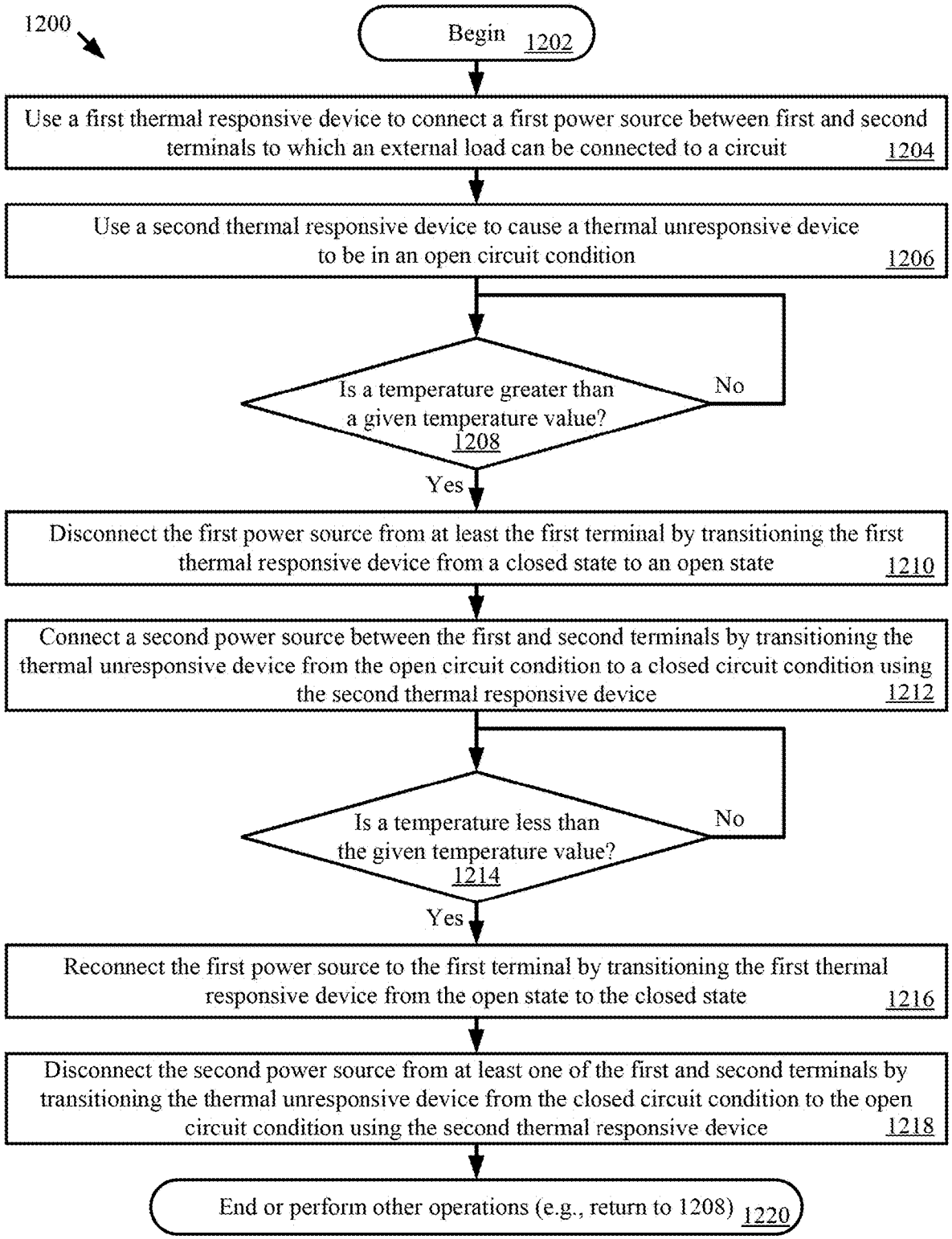
FIG. 12 provides a flow diagram of an illustrative method for operating an electronic device.

Referring now to FIG. 12, there is provided a flow diagram of an illustrative method 1200 for operating a circuit (e.g., power source 250 of FIG. 2, the circuit of circuit board 1000 of FIG. 10 and/or the circuit shown in FIG. 11). Method 1200 begins with 1202 and continues with 1204 where a first TRD (e.g., TRD 1104 of FIG. 11) is used to connect a first power source (e.g., primary power source 1010 of FIGS. 10-11) between first and second terminals (e.g., terminals 1104, 1106 of FIG. 11) to which an external load (e.g., components 202-214 of the communication device 200 of FIG. 2 and/or load 1150 of FIG. 11) can be connected to the circuit. The first power source can include, but is not limited to, lithium ion battery cell(s). The first TRD can include, but is not limited to, a thermistor or a thermal fuse.

In 1204, a second TRD (e.g., TRD 1112 of FIG. 11) is used to cause a TUD (e.g., TUD 1108 of FIG. 11) to be in an open circuit condition. The second TRD can include, but is not limited to, a thermistor or a thermal fuse. The TUD can include, but is not limited to, a FET. The TUD is in the open circuit condition when the second TRD is in a closed state.

Next, operations are performed in 1208 to detect or otherwise determine whether a temperature of a surrounding environment exceeds a given temperature value (e.g., sixty-five degrees Celsius). If not [1208:NO], then method 1200 returns to 1208 so that the circuit can continue to monitor the temperature of the surrounding environment. If so [1208:YES], then method 1200 continues with 1210 where the first power source is disconnected from at least the first terminal (e.g., terminal 1104 of FIG. 11) by transitioning the first TRD from a closed state to an open state. A second power source (e.g., secondary power source 1012 of FIGS. 10-11) is connected between the first and second terminals in 1212. This connection is achieved by transitioning the TUD from the open circuit condition to a closed circuit condition using the second TRD. The second power source can include, but is not limited to, a supercapacitor or an alternate chemistry battery.

In 1214, the circuit detects or otherwise determines whether the temperature of the surrounding environment is less than the given temperature value. If such detection/determination is not made [1214:NO], then the circuit continues to monitor the temperature of the surrounding environment. If such detection/determination is made [1214:YES], then method 1200 continues with 1216 where the first power source is reconnected to the first terminal. This reconnection is made by transitioning the first TRD from the open state to the closed state. The second power source is disconnected from the first terminal and/or the second terminal in 1218. This disconnection is made by transitioning the TUD from the open circuit condition to a closed circuit condition using the second TRD. The TUD is in the closed circuit condition when the second thermal responsive deice is in an open state. Subsequently, 1220 is performed where method 1200 ends or other operations are performed (e.g., return to 1208).

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

I claim:

1. A method for operating a circuit, comprising:
using a first thermal responsive device to create an electrical connection that connects a first power source between first and second terminals to which an external load can be connected to the circuit, wherein said first thermal responsive device is connected in series with the first power source between two input lines of the circuit;
using a second thermal responsive device to cause a thermal unresponsive device to be in an open circuit condition, wherein said thermal unresponsive device is connected in series with a second power source between the two input lines of the circuit and said second thermal responsive device is connected between the two input lines of the circuit and directly to a terminal of the thermal unresponsive device; and
responsive to a temperature of a surrounding environment exceeding a given temperature value,
disconnecting the first power source from at least one of the input lines of the circuit by transitioning the first thermal responsive device from a closed state to an open state, and
connecting a second power source between the first and second terminals by transitioning the thermal unresponsive device from the open circuit condition to a closed circuit condition using the second thermal responsive device.

2. The method according to claim 1, wherein the first or second thermal responsive device comprises a thermistor or a thermal fuse.

3. The method according to claim 1, wherein the thermal unresponsive device comprises a field effect transistor.

4. The method according to claim 1, wherein the given temperature value is equal to or greater than sixty-five degrees Celsius.

5. The method according to claim 1, wherein the thermal unresponsive device is in the open circuit condition when the second thermal responsive device is in a closed state.

6. The method according to claim 1, further comprising reconnecting the first power source to the second terminal by transitioning the first thermal responsive device from the open state to the closed state, responsive to the temperature of the surrounding environment being less than the given temperature value.

7. The method according to claim 5, further comprising disconnecting the second power source from at least one of the first and second terminals by transitioning the thermal unresponsive device from the closed circuit condition to the open circuit condition using the second thermal responsive device.

8. The method according to claim 6, wherein the thermal unresponsive device is in the closed circuit condition when the second thermal responsive device is in an open state.

9. The method according to claim 1, wherein the first power source comprises lithium ion battery cells and the second power source comprises a supercapacitor or an alternate chemistry battery.

10. The method according to claim 1, wherein the load is a radio and the circuit allows the radio to operate at temperatures exceeding at least sixty-five degrees Celsius for a certain period of time.

11. A circuit, comprising:
first and second power sources connected in parallel with each other between two input lines of the circuit;
a first thermal responsive device connected in series with the first power source between the two input lines of the circuit and configured to selectively connect and disconnect the first power source from at least one of the two input lines that is connected to a first terminal of two terminals between which an external load can be connected to the circuit, wherein a selective connection and disconnection of the first power source from the at least one of the two input lines is based on a temperature of a surrounding environment;
a thermal unresponsive device connected in series with the second power source between the two input lines of the circuit; and
a second thermal responsive device connected between the two input lines of the circuit and directly to a terminal of the thermal unresponsive device, wherein the second thermal responsive device is configured to selectively cause the thermal unresponsive device to transition between an open circuit condition and a closed circuit condition based on the temperature of the surrounding environment;
wherein the first power source is connected to the first and second terminals and the second power source is disconnected from at least one of the first and second terminals when the temperature of the surrounding environment exceeds the given temperature value; and
wherein the first power source is disconnected from at least one of the first and second terminals and the second power source is connected to the first and second terminals when the temperature of the surrounding environment is less than the given temperature value.

12. The circuit according to claim 11, wherein the first or second thermal responsive device comprises a thermistor or a thermal fuse.

13. The circuit according to claim 11, wherein the thermal unresponsive device comprises a field effect transistor.

14. The circuit according to claim 11, wherein the given temperature value is equal to or greater than sixty-five degrees Celsius.

15. The circuit according to claim 11, wherein the thermal unresponsive device is in the open circuit condition when the second thermal responsive device is in a closed state.

16. The circuit according to claim 11, wherein the first power source is disconnected from the first terminal when the temperature of the surrounding environment exceeds the given threshold value, and the second power source is disconnected from the second terminal when the temperature of the surrounding environment is less than the given temperature value.

17. The circuit according to claim 16, wherein the second power source is disconnected from the second terminal by transitioning the thermal unresponsive device from the closed circuit condition to the open circuit condition using the second thermal responsive device.

18. The circuit according to claim 17, wherein the thermal unresponsive device is in the closed circuit condition when the second thermal responsive device is in an open state.

19. The circuit according to claim 11, wherein the first power source comprises lithium ion battery cells and the second power source comprises a supercapacitor or an alternate chemistry battery.

20. The circuit according to claim 11, wherein the load is a radio and the circuit allows the radio to operate at temperatures exceeding at least sixty-five degrees Celsius for a certain period of time.

\* \* \* \* \*